United States Patent

[11] 3,540,504

| [72] | Inventors | David Wylie Hall<br>Burnham;<br>Robert Sydney Spratley, Slough, England |
|---|---|---|
| [21] | Appl. No. | 645,679 |
| [22] | Filed | June 13, 1967 |
| [45] | Patented | Nov. 17, 1970 |
| [73] | Assignee | National Research Development Corporation<br>London, England |
| [32] | Priority | June 13, 1966 |
| [33] | | Great Britain |
| [31] | | 26,293/66 |

[54] DECORTICATING APPARATUS
6 Claims, 9 Drawing Figs.

[52] U.S. Cl. .................................................... 146/13,
146/291, 146/292
[51] Int. Cl. ...................................................... A23n 5/00
[50] Field of Search .......................................... 146/8, 13,
32, 291; 130/30B, 30J

[56] References Cited
UNITED STATES PATENTS

| 652,919 | 7/1900 | McHugh .................. | 146/8X |
| 899,433 | 9/1908 | Raby ...................... | 146/8UX |
| 2,435,592 | 2/1948 | Loewy .................... | 146/32X |
| 2,791,254 | 5/1957 | Crane ..................... | 146/32X |

FOREIGN PATENTS

| 203,141 | 9/1923 | Great Britain ............ | 130/30 |

*Primary Examiner*—W. Graydon Abercrombie
*Attorney*—Cushman, Darby & Cushman

ABSTRACT: An apparatus for decorticating nuts or the like in which nuts are induced to pass through a localized restriction contained between two parallel faces having relative motion where a combined rolling and crushing force breaks open the nuts and releases the kernels contained therein allowing the kernels to pass freely from the restriction without further damage.

Patented Nov. 17, 1970 3,540,504

Patented Nov. 17, 1970 3,540,504

DECORTICATING APPARATUS

This invention relates to a method and apparatus for the decorticating or shelling of groundnuts or other plant products which require to be handled in such a way as to separate kernels or seeds from coverings or shells.

In the case of groundnuts it is preferable that the kernels be extracted from their shells in an undamaged condition, i.e. without being split or having their skins damaged. For this reason recovery of the kernels is often accomplished manually since, with the decorticating machines available a significant proportion of the kernels are damaged and rendered unsuitable e.g. for inspection purposes, for edible trade, or for seed for planting. An object of this invention is to provide decorticating apparatus which can be adjusted so that it can treat nuts of varying sizes and yet recover a higher proportion of undamaged kernels than heretofore.

According to this invention a method of decorticating or shelling nuts or like articles includes the steps of introducing the nuts between two spaced relatively moving members, applying a combined rolling and crushing force to the nut by the said two members to break open the shells without damaging the kernels therein, and discharging the shells and kernels.

Apparatus for carrying out the method of this invention may comprise a substantially vertical chute which presents a transverse form which is elongated but narrow, through which chute nuts or like articles to be decorticated can pass, one of the wider walls of the said chute having mounted thereon a stationary shelling member including a sheet of resilient plastics material or one or more solid bars having cutting edges whilst the wall opposite thereto has associated therewith a rotary plate which carries a movable shelling member including a strip or strips of grating or grinding material or one or more solid bars having a cutting edge and the rotary disc being adjustable. The strip or strips of grating or grinding material on the disc may be replaced by a sheet or sheets of resilient plastics material and/or the sheet of resilient plastics material on a wider wall of the chute replaced by a strip of grating or grinding material.

Another form of apparatus for carrying out the method of this invention may include a frame supporting an endless belt between rollers, an adjustable member carrying a stationary shelling member, a feed chute for directing groundnuts between the belt and the stationary shelling member, a discharge chute through which kernels and shells may pass, and driving means for driving the endless belt. As an alternative to the endless belt and supporting rollers a single large diameter roller may be used. The stationary shelling surface can be formed of a resilient material whilst the endless belt, or surface of the large diameter roller, can be of a high frictional or abrasive nature.

The invention will now be described by way of example only, in the accompanying drawings of which:

Figure 1:
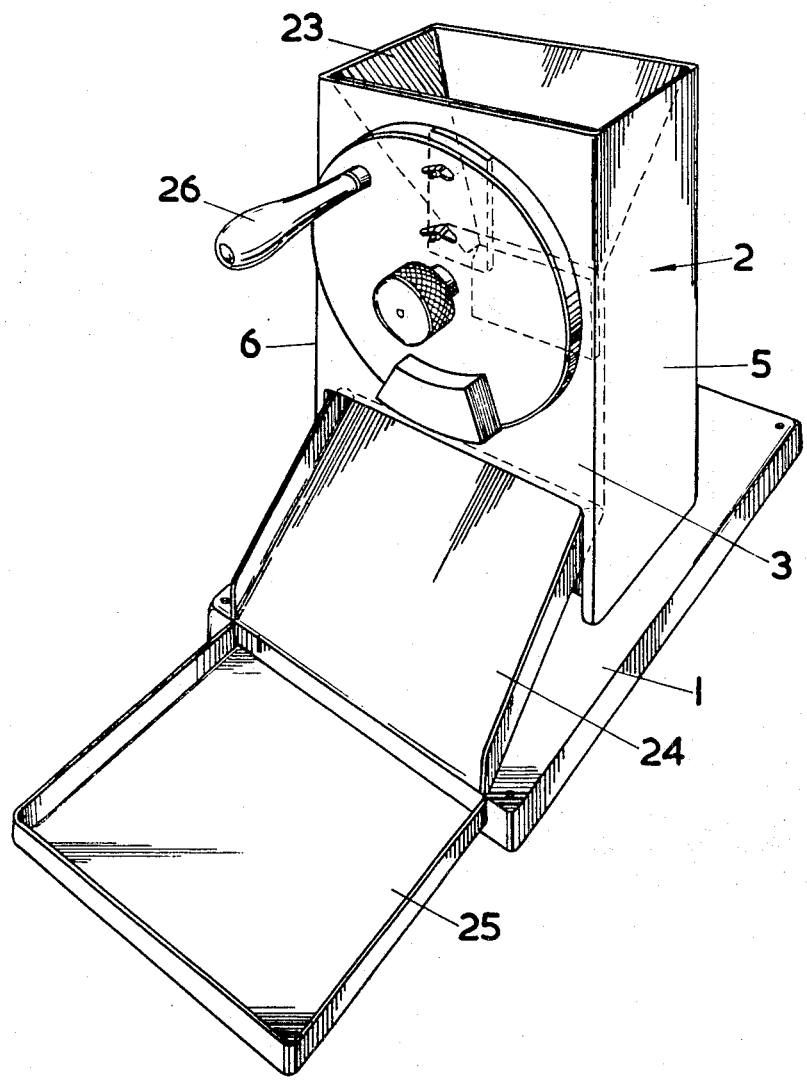
FIG. 1 is a perspective view of one form of the invention for shelling small quantities of nuts.
Figure 2:
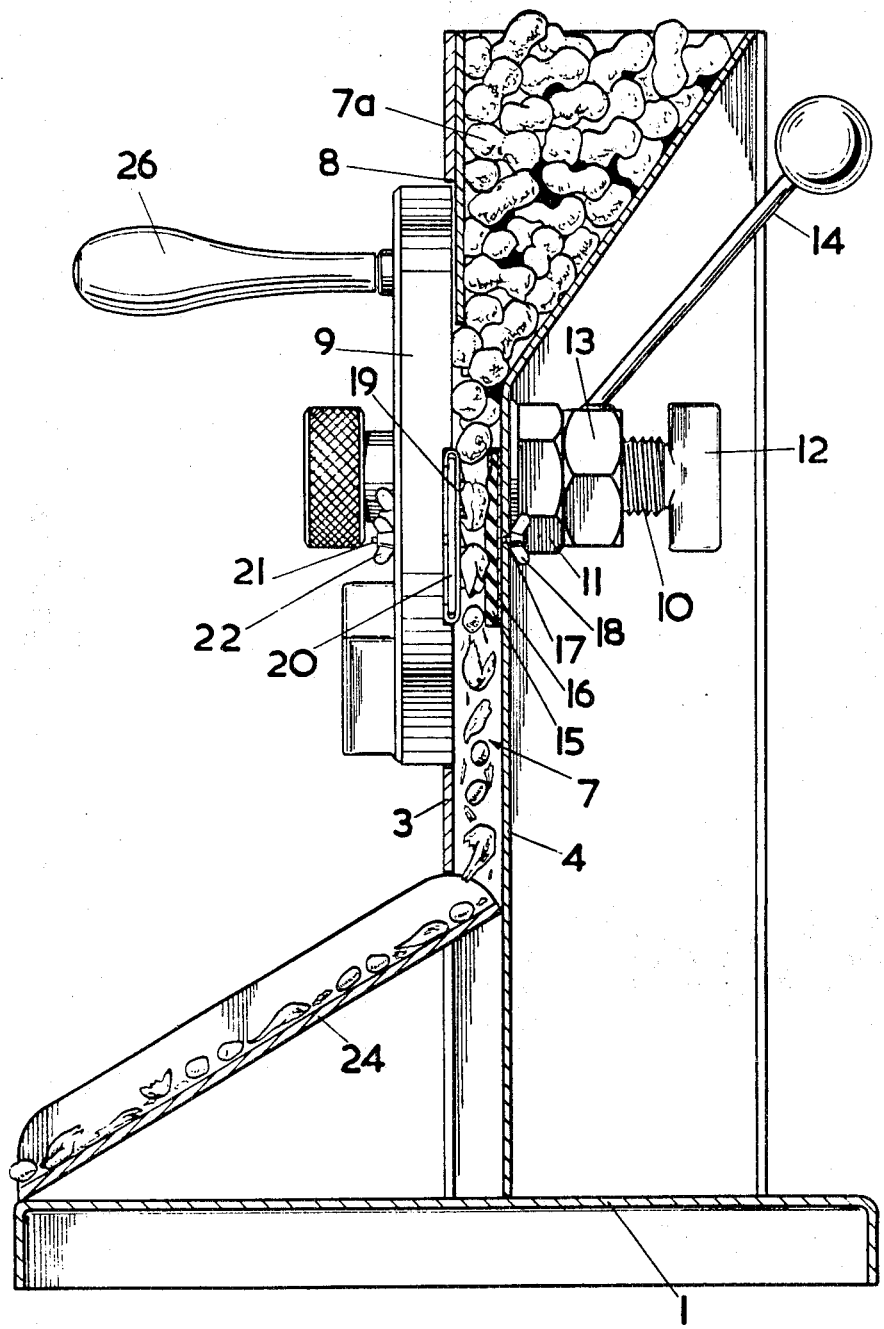
FIG. 2 is a sectional view of FIG. 1.

As seen in FIGS. 1 and 2 one form of decorticating apparatus comprises a base plate 1 from which extends upwardly a tubular member generally indicated at 2 formed by a front wall 3 and a rear wall 4 parallel thereto and spaced a short distance therefrom, and end walls 5 and 6 which are a considerable distance apart. The tubular member 2 thus constitutes a chute 7 having a rectangular passage therethrough which is elongated but narrow in width; for example the distance between the end walls 5, 6 may be about ten inches whilst the front and rear walls 3, 4 may have a distance between them of a half-inch to three-quarters of an inch. The upper part of the rear plate 4 is inclined rearwards so that the upper end of this tubular member 2 is flared or bell-mounted to form a hopper 7a or to serve as the lower part of a hopper, shaped in such a way as to require that the groundnuts are aligned lengthwise between the front and rear walls 3, 4.

The front wall 3 has formed therein an aperture 8 whose diameter is substantially equal to the distance between the end walls 5, 6 of the chute 7 and a rotary disc 9 is located in and closes said aperture 8. This disc 9 is rotatable upon a bearing (not shown) mounting on the fore end of a shaft 10 which extends across the chute 7 and through a hole in the rear wall 4 to beyond the said rear wall 4. Coaxial with the hole in the rear wall 4 and extending rearwardly thereupon is a screw-threaded bore in a boss 11 secured to or formed integrally with the rear wall 4, the rear end of the shaft 10 being correspondingly screw threaded and provided with an adjusting plate 12. By rotation of the shaft 10 it is movable axially, thereby permitting the disc 9 to be moved towards or away from the rear wall 4 as required. When the disc 9 has been moved to a desired position the shaft 10 is locked against rotation by a lock nut 13 provided with a handle 14 or by any other suitable means.

Secured on the inner face of the rear wall 4 to one side of the shaft 10 and forming a stationary shelling member is a sheet of resilient plastics material 15 mounted on a backing plate 16 provided with two studs 17 which pass through holes in the rear wall 4 and have screwed thereon wing nuts 18. Mounted on the face of the disc 9 directed towards the rear wall is secured a movable shelling member comprising a strip or strips of grating or grinding material 19 (also seen in FIG. 5) disposed radially of the disc 19 and mounted on a backing plate 20. This backing plate 20 carries two studs 21 which pass through holes in the disc 9 and are engaged by wing nuts 22 to mount the grating strip 19 on the disc 9. An inclined strip 23 is positioned in the side of the hopper 7a opposite to that on which the sheet of resilient plastics material 15 located. This inclined strip 23 effectively blocks one-half of the chute 7 and guides articles between the grater or grinder 19 and the sheet of resilient material 15.

In the operation the distance between the rear wall 4 and the disc 9 is set by adjustment of the disc and thereafter the articles to be decorticated are fed into the chute. In the case of groundnuts which are elongated in structure they will, by the nature of their shape, ultimately be brought into a position in which they extend lengthwise between and substantially parallel to the front and rear walls 3, 4 of the chute 7 at the upper end thereof. As the disc 9 is revolved the leading edge of the grating strip 19 engages a nut and draws it downwards. Whilst a nut is passing between the grater 19 and the resilient sheet 15 it is subjected to a combined rolling and crushing action which breaks the shells to release undamaged kernels. After passing downwardly beyond the grating material 19 and the resilient sheet 15 the kernels and the broken shells encounter an inclined plate 24 which directs them through an opening or exit at the lower end of the front wall to a separating area 25 where the kernels are manually separated from the shells.

In one mechanised form the separating means may consist of a plate inclined downwardly away from the opening or exit, the kernels being projected further from the chute than the lighter shells. Other separating means such, for example, as a reciprocatory sieve or a stream of compressed air may be employed.

The disc 9 can be rotated by a handle 26 or it may have a pulley or pinion mounted thereon and be rotated through a belt drive or chain drive from any convenient source of energy, e.g. an electric motor. Obviously several discs associated respectively with separate chutes can be employed. When a plurality of graters or grinders in separate chutes are simultaneously in operation the groundnuts or other articles to be treated may be fed from a hopper into a riddle or other size grading means from which the groundnuts or other articles to be treated are fed to separate chutes according to their size. The rotary discs in the several chutes are adjusted in position so that each chute conveys groundnuts or the like of appropriate like size.

Figures 3, 4, 5:
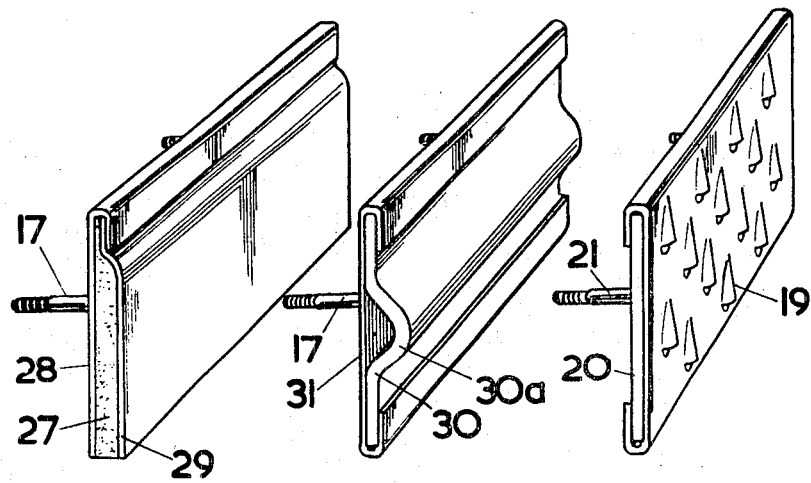
FIGS. 3, 4 and 5 are enlarged perspective views of parts of the apparatus seen in FIGS. 1 and 2.

FIG. 3 shows another form of stationary shelling member, for mounting on the rear wall 4, comprising a foamed plastics layer 27 secured on a backing plate 28 and covered with a layer of solid plastics 29. The backing plate 28 has one edge bent over to grip and pinch the foamed and solid plastics 27, 29. The bent over part of the backing plate 28 prevents the foamed and solid plastics 27, 29 being torn away from the backing plate 28 by the nuts during shelling operations. Studs 17 are fixed to the rear of the backing plate 28.

FIG. 4 shows another form of stationary shelling member for mounting on the rear wall 4, FIG. 2. It comprises a thick strip of resilient plastics 30 compressed transversely so that it bulges to form a resilient ridge 30a. The strip 30 is mounted on a backing plate 31 which has its edges bent over to grip the resilient strip 30.

FIG. 5 is an enlarged view of the grating material mounted on the disc 9, FIGS. 1, 2, and shows how the edges of the grating material 19 are bent over so that it can be detachably mounted on the backing plate 20. Thus a number of different grating strips, each of a different roughness, may be mounted on the backing plate 20.

The stationary shelling members shown in FIGS. 3, 4 and at 15, 16 and 17, FIGS. 1 and 2, and the grating material 19, FIG. 5, may be used in any desired combination depending upon the nature of the nut being shelled. The grating material 19 may be mounted either on the disc 9 as shown or on the rear wall 4. For this reason the spacing of the studs 17 and 21 on the backing plates 16, 28, 31 and 20 respectively is identical as is the overall size of the backing plates 16, 28, 31 and the grating material 19.

If desired the faces of the stationary shelling members formed of plastics material i.e. 15, FIG. 2, 29, FIG. 3, and 30, FIG. 4 may be of a roughened or patterned nature.

Figure 6:
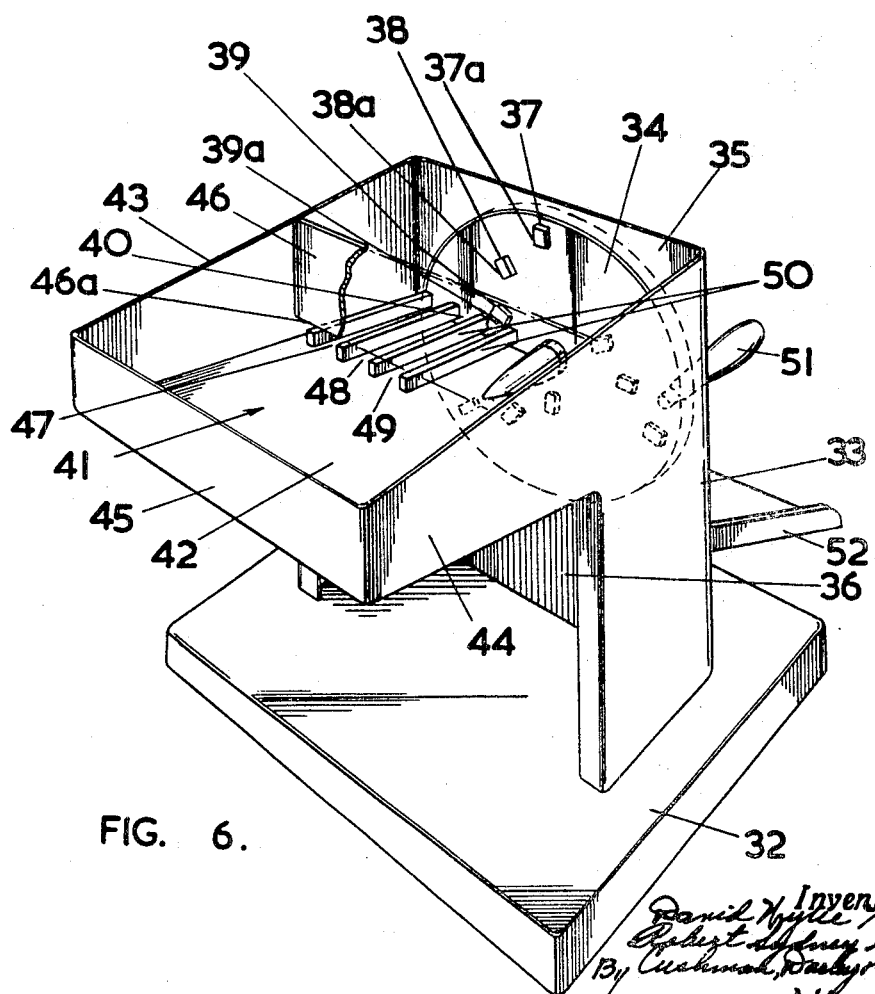
FIG. 6 is a perspective view of another form of the invention for shelling nuts having strong shells.

FIG. 6 shows another form of the invention capable of shelling nuts having hard shells. It is similar to the apparatus shown in FIGS. 1 and 2 in that it has a base plate 32 from which a tubular member 33 extends upwardly. A disc 34 is rotatably mounted on a front wall 35 of the tubular member 33 and is adjusted towards and away from the rear wall 36 of a chute formed between the said rear wall 36 and the front wall 35. It differs from the previous apparatus in that the disc 34 carries a number of short bars or strips of metal 37, 38, 39 each having a cutting edge 37a, 38a, 39a and arranged on the disc 34 in a staggered formation. These cutting edges 37a, 38a, 39a cooperate with a stationary cutting edge 40 formed on a solid bar at the top of the rear wall 36 of the chute.

To crack open nuts a number of them are placed in a hopper 41 having a sloping bottom 42, side walls 43, 44, a rear wall 45 and an adjustable front wall 46. This front wall 46 has its lower edge 46a above the hopper bottom 42 so that the nuts may roll singly into channels 47, 48, 49 formed between guide bars 50. Thus, when the disc 34 is rotated by its handle 51 and the hopper 41 and channels 47, 48, 49 are filled with nuts, nuts in the channels 47, 48, 49 are successively shelled as they are cracked open between the cutting edges 37a, 38a, 39a on the disc 34 and the stationary edge 40. Thereafter shelled nuts pass out of the apparatus down an inclined plate 52.

By raising or lowering the front wall 46 of the hopper 41 nuts of differing sizes are allowed to pass into the channels 47, 48, 49. The gap between the disc 34 and the rear wall 36 of the chute will be adjusted as necessary. Although the apparatus as arranged in FIG. 6 requires that nuts be graded before being placed in the hopper 41 it is possible to arrange for grading of the nuts in the hopper 41 and directing nuts into the appropriate channel for their size. This could be done by inclining the hopper bottom 42 and the lower edge 46a of the hopper front wall 46 to each other. The cutting edges 37a, 38a, 39a on the disc 34 are then arranged at varying heights above the surface of the disc 34 so as to provide varying gaps between the said cutting edges 37a, 38a, 39a and the cutting edge 40.

Figure 7:
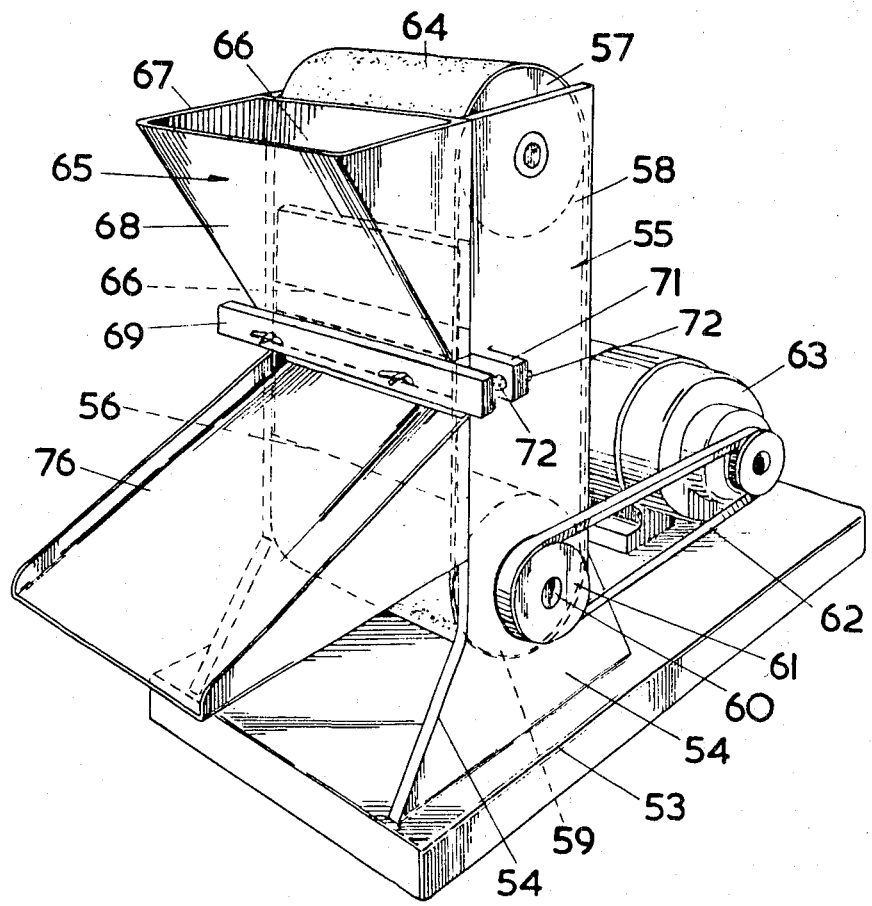
FIG. 7 is a perspective view of another form of the invention for shelling large quantities of nuts.
Figures 8, 9:
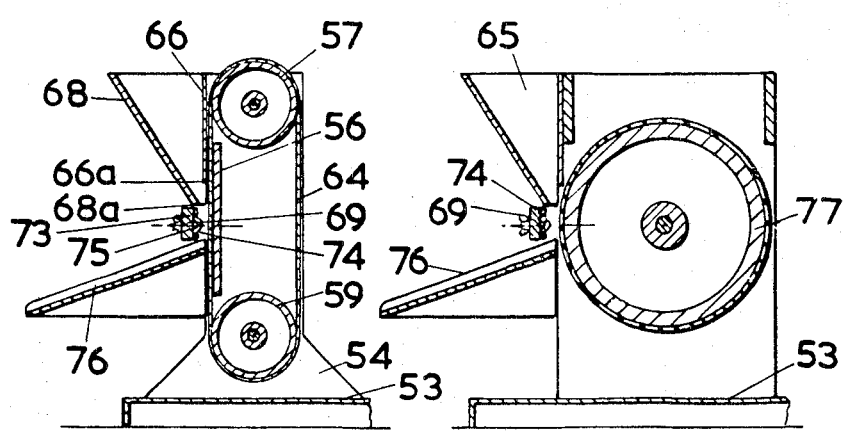
FIG. 8 is a sectional view of FIG. 7.
FIG. 9 is an alternative form of the invention shown in FIGS. 7 and 8.

FIGS. 7 and 8 show another form of the invention comprising a frame including a rectangular base plate 53 to which is fixed by upright plates 54, a length of channel section material 55 arranged with its length perpendicular to the base and with its web 56 transverse of the base 53. At the top of the channel section 55 a roller 57 is mounted in bearings in the flanges 58 of the channel section 55. Similarly at the bottom of the channel section 55 is a second roller 59 mounted in bearings in the flanges 58 and having an extended shaft 60 at one end which passes through the bearing and the flange 58. A pulley wheel 61 is mounted on the free end of this shaft 61 and is rotated by a belt drive 62 from an electric motor 63 mounted on the base plate 53. An endless belt 64 which forms a movable shelling member is mounted on the rollers 57, 59 with the web 56 of the channel section 55 between the unsupported lengths of the belt 64 and with the outer face of the web 56 in close proximity with one of the unsupported lengths of belt 64. A feed chute or hopper 65 is fixed to the flanges 58 of the channel section 55 and comprises a rear plate 66 arranged parallel to the web 56 of the channel section 55 and in close proximity to the endless belt 64 with its lower edge 66a a little above the mid point between the rollers 57, 59. Sides and front of the chute 67, 68 respectively are arranged so that the top of the chute 65 is greater in cross-sectional area than the bottom, and the lower edge 68a of the front plate 68 is below the lower edge 66a of the rear plate 66. At the bottom of the front plate 68 is located a rectangular section bar forming an adjustable member 69 movable towards or away from the belt 64 by means of studs 70 carried at the ends of the bar passing through lugs 71 on the flanges 58 of the channel section 55 and operated upon by nuts 72 screwed on the studs 70 on both sides of the lugs 71. This adjustable member 69 carries a stationary shelling member 73 formed by a resilient plastics or rubber strip 74 mounted on a backing plate 75 or holder and shaped or bent to form a ridge which extends across the width of the belt 64. The stationary shelling member 73 is similar in construction to that shown in FIG. 4 except that its length is greater. A downwardly directed discharge chute 76 is secured to the frame below the adjustable member 69 to direct shelled nuts from between the resilient strip 74 and the endless band 64 to a suitable receptacle. Tension of the endless belt can be adjusted by moving the rollers apart, or by the use of an adjustable jockey pulley (not shown).

In operation the electric motor 63 is set in motion to rotate the endless belt 64, groundnuts or other nuts are then placed in the feed chute 65, e.g. discharged therein from a hopper. The groundnuts at the bottom of the feed chute 65 contact the belt 64 and are rotated and drawn downwardly through the restricted space between the belt 64 and the resilient plastics strip 74 where the shells are broken open to release the kernels therein. Thereafter the shells and kernels pass along the discharge chute 76. To prevent damage to the nuts prior to shelling operation thereon they are not allowed to contact the endless belt 64 prior to being drawn between the belt 64 and the resilient strip 74. For this reason the rear plate 66 of the feed chute 65 has its lower edge 66a only a sufficient distance above the resilient strip 74 so that nuts can be gripped by the band 64 and drawn past the resilient strip 74.

The shells of groundnuts vary in texture between different regions of the world. For example some shells are quite brittle whilst others are rather soft and ductile. Therefore it is necessary to provide a number of resilient strips of differing hardness. Instead of a bent strip of plastics a flat strip may be used, of solid or foam backed plastics, and shaped so that its lower edge is nearer the belt than its top edge. If a flat strip of plastics is used then the backing plate 75 is folded over the upper edge of the plastics to prevent its being torn from the backing plate as seen in FIG. 3. The endless band 64 is of a material which can grip the nuts and draw them downwards past the resilient strip 74. Examples of belts are an abrasive surface belt, a thin solid plastics layer of any suitable patterned surface on a suitable backing layer, or a thick layer of very resilient plastics on a backing layer, or a sandwich construction of thin solid plastics over a layer of foamed-plastics. With the latter construction of belt it may be possible, for the treatment of groundnuts, to have a solid strip of grating or grinding material forming the stationary shelling member similar to that seen in FIG. 5.

Groundnuts vary in size and therefore the adjustable member 69 must be moved towards or away from the belt 64 depending upon the size of groundnut which is intended to be shelled. If the gap between the resilient strip 74 and the band 64 is too large then groundnuts will pass through the gap without being shelled. And if the gap is too small then the kernels will be damaged. Thus groundnuts must be graded and the adjustable member adjusted for each size of nut. Alternatively, by using three of these machines in series and adjusting the first to shell only the large nuts, the second the medium-sized nuts and the third the small nuts, it is possible to shell most sizes of nuts effectively by arranging the three machines to make use of gravity and suitably sized screens between each.

In the alternative form of the invention shown in FIG. 9 the two rollers 57, 59 and the endless belt 64 are replaced by a single large diameter roller 77 arranged with its axis parallel to and on a level with the resilient strip 74. The surface of the said roller 77 may be of an abrasive or other high frictional nature, or formed of a layer 78 of plain or patterned plastics either secured direct to the roller 77 or on a foamed plastics material secured on the roller 77.

We claim:

1. Apparatus for decorticating nuts or like articles comprising two faces, each face being substantially flat, vertical, and parallel to the other, one of said faces being stationary, said second face being movable in its own plane relative to said stationary face, means for adjusting the distance between said faces, at least a first face of said faces having a roughened surface, a second face having a grinding surface consisting of at least one mounted strip of grinding material, any one such mounted strip cooperating with said first face to offer a single localized restriction in a path formed between said faces through which said nuts are forced by relative motion between said faces; one of said faces being surfaced with resilient material in the form of at least one strip removably mounted on said face with the longer dimension of each of said strip being substantially transverse to the direction of relative motion.

2. Apparatus for decorticating nuts or like articles comprising two faces, each face being substantially flat, vertical, and parallel to the other, the first of said faces being stationary, the second face being movable in its own plane relative to said stationary face, means for adjusting the distance between said faces, said first face having mounted thereon a stationary shelling member, said second face having mounted thereon a grinding surface having at least one bar, any one such bar cooperating with said stationary shelling member to offer a single localized restriction in a path formed between said faces through which said nuts are forced by relative motion between said faces; and further including a substantially vertical chute, said vertical chute having two wide transverse walls connected by narrow end walls, said connected transverse and end walls forming a passage through which undecorticated nuts can pass, said first face being formed from one of said wide transverse walls of said chute said other wide transverse wall being associated with a rotary disc to form said second face, said rotary disc having at least one bar, and means to adjust the distance between said stationary shelling member and said rotary disc.

3. Apparatus according to claim 2 wherein each bar is provided with a cutting edge.

4. Apparatus according to claim 1 wherein one of said faces is surfaced with a resilient plastics material and said other face is surfaced with at least one strip of grating material.

5. Apparatus according to claim 1 comprising a frame; two rollers rotatably mounted in the frame; an endless belt mounted on the rollers constituting one of said faces; said other face having a stationary shelling member connected to the frame and spaced a short distance from the endless belt; adjusting means for varying the distance between the said shelling member and the endless belt; a feed chute for directing nuts between the belt and the shelling member; a discharge chute through which kernels and broken shells may pass, and means for driving the belt.

6. Apparatus according to claim 1 comprising a frame; a large diameter roller rotatably mounted in the frame constituting one of said faces; said other face having a stationary shelling member connected to the frame and spaced a short distance from the said roller; adjusting means for varying the distance between the said shelling member and the said roller; a feed chute for directing nuts between the shelling member and the roller; a discharge chute through which kernels and broken shells may pass; and driving means for driving the large diameter roller.